Nov. 3, 1970  E. BOGNAR  3,538,067
METHOD FOR THE POLYMERIZATION OF VINYL CHLORIDE IN MASS
Filed Feb. 8, 1967  2 Sheets-Sheet 1

INVENTOR.
ETIENNE BOGNAR
BY
ATTORNEYS

3,538,067
METHOD FOR THE POLYMERIZATION OF VINYL CHLORIDE IN MASS
Etienne Bognar, Madrid, Spain, assignor to Compagnie de Saint-Gobain, Neuilly-sur-Seine, France
Continuation-in-part of applications Ser. No. 97,892, Feb. 27, 1961, and Ser. No. 520,805, Jan. 14, 1966. This application Feb. 8, 1967, Ser. No. 614,680
Claims priority, application France, Feb. 26, 1960, 819,762
Int. Cl. C08f *1/04, 1/10, 3/30*
U.S. Cl. 260—92.8     8 Claims

ABSTRACT OF THE DISCLOSURE

Polyvinyl chloride is produced in a permeable form of spherical grains free of pellicles.

---

This application is a continuation-in-part of Ser. Nos. 97,982, filed Feb. 27, 1961, now abandoned and 520,805, filed Jan. 14,, 1966, now abandoned, partaking of their priority, of that of French application PV 819,762 of Feb. 26, 1960, and of those stated in the oath forming part of this application.

The present invention relates to an improvement in the polymerization of ethylene derivatives, whose polymers are insoluble in their monomers, by polymerization in mass, that is to say in the absence of solvents, diluents, and dispersing agents. The polymerization in mass of derivatives of ethylene, of which vinyl chloride is notable, involves a number of difficulties which arise largely from the fact that the reaction is exothermic, is carried out commercially in large masses in autoclaves of large volume, equipped with cooling jackets which can only act on part of the mass at one time, which makes it difficult to withdraw the heat released either uniformly or adequately, or to impart uniform qualities to the products obtained.

During the polymerization in mass it has been established that the whole of the liquefied monomer undergoing polymerization rapidly acquires a pulverulent state. For example, in polymerizing vinyl chloride the pulverulent state is reached when about 25% of the raw material is polymerized. As polymerization is carried out in many cases to an end point of about 70–75% of completion, about two-thirds of the process proceeds in the solid state. This pulverulent state lends itself ill to heat exchange and the correct and regular removal of the calories released during the reaction by the cooling jackets, and the maintenance of uniform temperature is rendered difficult. Means have been employed to agitate the pulverulent mass and continuously change the part of it in contact with the wall in an effort to produce a homogeneous dispersion of the solid particles of polymer in the vapor phase of the monomer, but have not prevented the formation of aggregates by the polymerization of absorbed monomer so that at the end of the operation the product contains resin particles of very irregular and very different size and shape, and even crusts. Because of these difficulties it has been advisable, in the best prior practice, to employ a rotary autoclave even though this adds to the cost and complexity of apparatus, because, although the product is as described, the use of fixed autoclaves has resulted in a grave increase of these imperfections and in a less perfect product.

It is desirable to change the qualities of the product so that it may be suited to various purposes, and the standard method of varying the quality has been to vary the degree to which the monomer is polymerized, that is to say, to make larger or smaller polymer blocks or longer or shorter chains. It has not heretofore been feasible to make products of different quality, or of different granulometry, under uniform conditions by mechanical means alone, although this would be desirable were it possible.

It is an object of the present invention to employ a fixed autoclave for the polymerization of ethylene derivatives and lower olefines, while achieving results superior to those which have been achieved by the use of prior art fixed autoclaves equipped with stirrers, and rotary autoclaves. Another object is to polymerize such monomers on a large scale and in mass with improved regularity of polymerization and particle size. Another object is to produce different products by the polymerization of ethylene derivatives, whose polymers are insoluble in their monomers, by mechanical means even when similar conditions of temperature, pressure and catalysis are used. Another object is to control grain size in the manufacture of such polymers and to improve the uniformity of grain size. Another object is specifically to achieve these improvements in the manufacture of polyvinyl chloride.

The objects of the invention are accomplished generally speaking by a method of producing polymers of ethylenic monomers in mass with predetermined average grain size which comprises placing a monomer, the polymer of which is insoluble in the monomer, in mass in a confined space having peripheral temperature control, establishing within the confined space conditions of temperature and pressure favorable to polymerization, moving the polymerization mass repeatedly in turbulent flow in a circuit into contact with the temperature controlled periphery, progressively therealong and in contact therewith, thence out of contact therewith and in the opposite direction, and again into contact with the said periphery until the selected polymerization end point has been attained.

The novel process overcomes the recited imperfections by polymerizing in mass derivatives of ethylene of which the polymers are insoluble in their monomers in a cylindrical, fixed autoclave having a horizontally aligned axis and which is provided with a helical blade type agitator including at least two coaxial helical blades, with oppositely directed pitch, mounted on a shaft extending along the axis of the cylinder. The autoclave is equipped with heat exchange means in contact with the wall which provides for the maintenance of any selected temperature of polymerization. The agitator churns the mass, moves it to and away from the wall, tosses it against the shaft, and moves it from end to end of the cylindrical reaction chamber. In the polymerization in mass of monomers which are maintained to some degree in liquid phase under pressure, this apparatus secures the adequate mixing of the liquid and solid phases during polymerization and homogenizes the reaction mass. The apparatus prevents movements which form dead pockets or establish locations of temporary quiet wherein local overheating, degradation, and irregularity in the resin occur.

In the case of an agitator having two spiral blades, by selecting the diameter of the helices and their respective pitches the blades of the agitator move the resin from one to the other, toss it against the shaft which supports the blades, to and from the wall of the apparatus, and from end to end of the reaction chamber.

The thermal exchanges between the particles of the reaction mass and the water jacket surrounding the autoclave are particularly uniform because of the homogeneity of the reaction mass and of the intense agitation which achieves frequently repeated contact between each resinous particle and the wall, establishes a temperature of polymerization which is of superior uniformity and produces a product having uniform properties.

Resins are thus produced which have a total of advantageous properties which had been heretofore extremely difficult to produce by polymerization in mass. The use of a fixed autoclave materially simplifies the charge and discharge, the flow of the fluid through the heating jacket and the construction, disposition and use of the apparatus of control, temperature, and pressure. This fixity of the autoclave coupled with the regulation of the conditions of polymerization permits the extension of the polymerization process to continuous methods, provided that apparatus for continuous supply of monomer and continuous withdrawal of polymer be used.

The production of polyvinyl chloride in mass by former processes is pictured in FIG. 2, the grains being of unequal size, irregular shape, and produced by random expansion in random directions. The new product is in grains of equal size, of spherical shape, the product of equal expansion in all directions. The new spherical grains may be nodulated.

I have now discovered that the new product is not only specifically different from polyvinyl chloride of former types produced in mass, but from polyvinyl chloride produced in suspension, and in emulsion. In order to make this distinction clear I have adopted the following terminology:

Grain: An agglomeration of small particles. The grains are the spherical balls of which the product is largely composed.

Particles: The minute particles of polymer composing the spherical grains.

Coherent: The particles cohere to form the solid grain, which is strong and undergoes the standard manipulations and working without breaking up. This quality is very important, distinguishing the grains, e.g. from grains formed by the atomization of a latex of the type produced by polymerization in emulsion, which break up under minimal working forces.

Regular: The form and the dimensions of the grains differ but little throughout the polymer mass.

Essentially spherical form: The grains are basically spherical without requiring that they be geometrically true; they may have nodulations, but remaining basically spherical as distinguished from the amorphous product of FIG. 2.

Isotropic: The particles are of uniform size and are built up about a central nucleus by regular and uniform accretion in every direction.

Non-pellicular: The prior art product from non-mass processes has internal or external pellicles which obstruct the penetration of the grain by the additives employed in working the grains into shapes. The new product is pellicle free.

Micronic: The term signifies a dimension of a half to several microns.

Direct adhesion: The particles adhere to each other without the interposition of sizes or other additives.

Homogeneous: Polyvinyl chloride; free of the additives which would be acquired in emulsion or suspension polymerization.

It is a part of this invention to produce different products by mechanical steps, other conditions remaining the same. The speed of rotation of the agitator changes the nature of the product obtained. The invention thus permits diversification of product. A faster speed of rotation of the agitators increases the granulometry and the density of the resin, as is shown in the following table relating to the polymerization of vinyl chloride. The apparatus conformed to the present invention. The five operations each produced 70% transformation of monomer to polymer at different speeds but under otherwise identical conditions; temperature, pressure, and catalysts were the same.

| Speed of the agitator (turns per minute) | Apparent density | Granulometry, 0–250 microns |
| --- | --- | --- |
| 30 | 0.430 | 85.5 |
| 50 | 0.450 | 86 |
| 70 | 0.480 | 88.2 |
| 80 | 0.500 | 89.7 |
| 90 | 0.510 | 91.5 |

It is an astonishing effect of this process that it produces a novel and previously unknown type of polyvinyl chloride polymer, a nodulated globule or sphere, minute balls of astonishingly uniform size, which differ specifically from the irregular product of the prior art.

The process is applicable to all derivatives of ethylene of which the polymers are insoluble in their monomers, in particular to vinyl chloride, vinylidene chloride, acrylic nitriles, vinyl fluorides, as well as to copolymers of these monomers by themselves or with other polymerizable substances equally, provided that the copolymers are also insoluble in the mixture of monomers employed under the conditions of the polymerization.

The process is equally applicable to polymerization under low pressure of lower olefines such as ethylene or propylene in the presence of the usual catalysts. It is thus apparent that the process of the invention can also be adapted to polymerization in suspension or in emulsion of the same class of monomers on condition of choosing useful speeds of rotation.

The above and further objects and novel features of the present invention will more fully appear from the following detailed description when the same is read in connections with the accompanying drawings. It is to be expressly understood, however, that the drawings are for the purpose of illustration only and are not intended as a definition of the limits of the invention, reference for this latter purpose being had primarily to the appended claims.

Figure 1:
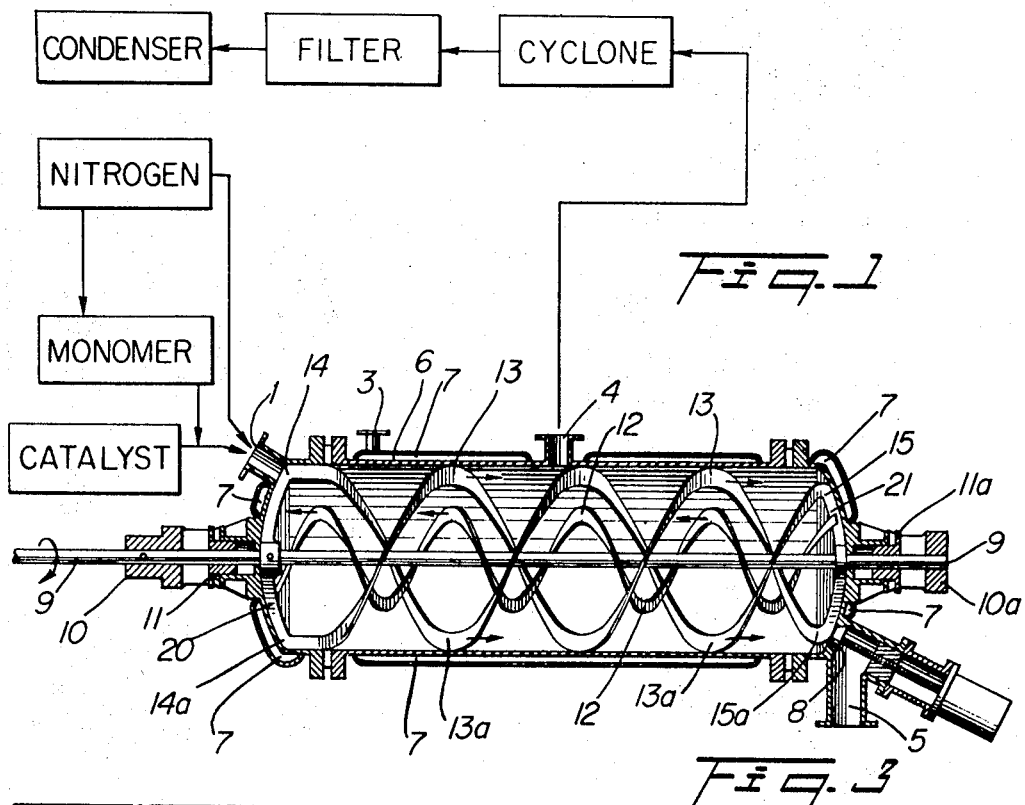
FIG. 1 is a vertical sectional view through the novel autoclave.

The figures of the drawing show that the micro structure of the different types of polyvinyl chloride is different and that of the present invention is superior to all others. The sphericity obtained was previously unknown in mass type polyvinyl chloride and the purity and grain structure were unknown in other types.

Figure 2:
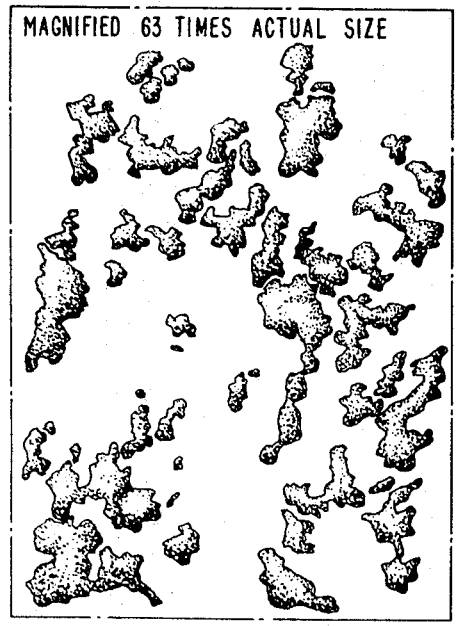
FIG. 2 is a drawing from a photomicrograph of a prior art product.
Figure 3:
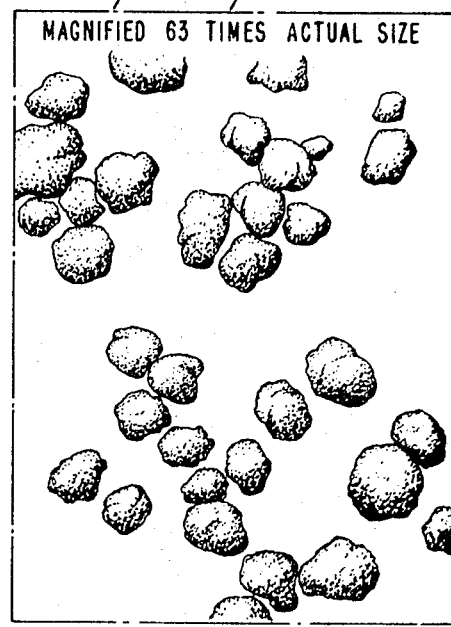
FIG. 3 is a drawing from the photomicrograph of the new product.

The magnification of the micrographs from which FIGS. 1–3 were taken was 63×.

The reactor employed is preferably horizontal but may be inclined from the horizontal if desired, for instance to assist in moving the product toward the point of discharge.

The agitator itself normally includes two spiral blades mounted on a shaft, the spiral of the outer having an exterior diameter approximating that of the interior diameter of the autoclave so that the inner wall of the autoclave will be continuously swept by the agitator. The blades may have any desired width and thickness. They may be continuous or segmental. The direction of the spiral in a single scraper may be partially reserved and this may be applied to either or both of the blades. If desired a third blade of analogous form or even more, may be added. The number of turns in the helices may be the same or different although the pitch of the outer may advantageously be greater than that of the inner helices.

The autoclave 6 is internally cylindrical, and is provided with end heads 20, 21 which are dished as sections of spheres. The end heads are provided with bearings including packing glands 11, 11a which support a shaft 9 which is keyed to a pulley 10 by which it may be rotated. Mounted on the shaft are helical blades 13, 13a which have the diameter of the inside of the cylinder 6. These helices are supported at their ends by blades 14, 15, 14a, 15a to conform to the spherical shape of the ends of the autoclave and are attached to the shaft 9. The pitch of these outer blades is shown as about equal to two full turns to the length of the cylinder and the pitch is lefthanded. The width of the blades is substantial in order that they may have a broad face to bear upon the loose granules of powder. The inner helical blade is provided with a righthand pitch, about four full turns to the length of the cylinder, and a diameter materially less than the diameter of the outer blades. Thus, rotation of the shaft in the direction of the arrow will move the lower grains toward the right, as shown by the arrows attached to the blades, while the inner helix will move the grains in the other direction. At the same time the grains will be rapidly moved away from the walls, toward the walls, against the shaft, and back and forth between the blades, with a general overall motion along the walls toward the righthand end of the apparatus and along the center toward the lefthand end.

The monomer is admitted through port 1. A port 4 is provided from which gases can be exhausted as desired, for instance, to sweep the autoclave of air before the polymerization begins. Ports 1 and 4 will be provided with appropriate valves which have not been shown. A discharge port 5 will be provided at the bottom of the cylinder at the opposite end from port 1. This is provided with a valve 8 which can be opened to discharge the product, which is speedily accomplished by the rotation of the blade.

A water jacket is provided so as to encompass substantially the whole autoclave. Ports 2 and 3 provide for the flow of heat, or cooling fluid, as the case may be, into contact with the walls of the autoclave where the frequent movement of every particle into contact with the walls maintains a high degree of uniformity in the polymerization reaction. The blades 15, 15a, etc., are shown as perpendicular to the shaft and are made of stainless steel or other non-reactive material.

In operation the autoclave will be swept free of air by the vaporization of vinyl chloride or by a flush of nitrogen gas, loaded with monomer and catalyst, brought to temperature and pressure, and the helix will be rotated at the speed chosen for the run, having in mind the density and granulometry desired in the final product. When the end point is reached, for instance 72%, the pressure falls off, the speed of the agitator may be reduced, the autoclave is vented of monomer, and opened to discharge its product.

EXAMPLE

A fixed horizontal autoclave constructed as shown in the drawing having a capacity of 500 liters, provided with thermometers for the regulation of the temperature of the jacket water was provided with a shaft rotatable between 30 and 90 turns per minute and the quantity of monomer was gauged in a chamber attached to the inlet, into which the catalyst was put, and from which the mixture was forced into the autoclave by nitrogen under pressure. The apparatus also included a vent system attached to the port 4 including a cyclone in which the major part of the polymer entrained by the gases is separated, followed by a filter and a condenser having a circulation of brine. There is introduced into the autoclave 210 kg. of vinyl chloride to which has been added 0.06 kg. (0.03%) of azodiisobutyronitrile catalyst, 10 kg. of monomer are vented to scavenge the air in the autoclave and the speed of rotation of the agitator is established at 70 turns per minute. Water at 60° C. is circulated through the jacket. The pressure in the autoclave progressively mounts to 9.5 kg./cm.$^2$ and the temperature establishes itself at 54.5° C. which is maintained throughout the operation by circulating cold water while the reaction temperature tends to increase by exotherm, and thereafter hot water (about 75–80° C.) when it tends to subside, thereby keeping the pressure at about 9.5 kg./cm.$^2$.

At the end of about 16 hours the pressure falls to 8.5 kg./cm.$^2$ even though the temperature of the water in the jacket be increased. The polymerization is now substantially at its end point and the speed of the agitator is reduced to 30 turns per minute. The gases are vented with some entrained monomer through conduit 4 toward the cyclone, the filter and the condenser. When the pressure equals atmospheric the autoclave, still agitated, is scavenged with a current of nitrogen for a quarter of an hour. The valve 8 is then opened and the contents are swept out to a storage bin by the outer helices.

After the autoclave has been scavenged of air and sealed the reaction mass is in the liquid and gas phases, the agitator produces a turbulent flow and intermixing of all parts of the reaction mass, the temperature rises rapidly until it attains its operating degree, which might be 62° C. for vinyl chloride, where it is checked and maintained by flowing cold water through the jacket. As the reaction proceeds a solid phase, the polymer, develops and is suspended in the liquid phase of the monomer. It also undergoes turbulent flow. As the polymerization approaches 25% the liquid phase disappears, being absorbed in the polymer and from that point on the reaction mass is in the gas and solid phases, but still under turbulent flow, it being the surprising capability of this apparatus that it is as efficient in the treatment and handling of the solid as of the liquid phase. When the reaction approaches its end point the temperature and pressure tend to fall and are maintained by increasing the temperature of the water jackets, but eventually a stage arrives at which no increase of jacket temperature will keep up the pressure; when this condition appears the reaction has run its course, the autoclave can be vented to release residual monomer, swept out by nitrogen to remove residual monomer from the polymer, and the speed of the helices reduced to what is necessary to achieve adequate scavenging and to evict the polymer.

The product differs specifically from what is known to the prior art both in improved granulometry and in the shape of its grains. There are more grains of the most desirable sizes and fewer of undesirable gross and fines; crusts do not practically exist, aggregates, in effect lumps united to others, are fewer, and the bulk of the mass is in concentrated and regular sizes. The process is also marked by the astonishing appearance of a new type of product, the nodulated spheres, as shown in FIG. 3 of the drawings, in roughly uniform size and large proportion. Even the smaller particles, the undeveloped grains which accompany these spheres have a sphericity which is not a characteristic of the prior art. The prior art grains in their useful sizes appear to have no structural duplicates and this irregularity and disorganization is so complete that the term amorphous may be applied to the product as a whole. The nodulated spheres of this invention are structurally regular and duplicitous, a new and very valuable form of polymer. The nodulated spheres can be separated from the accompanying fines by screening.

There is thus obtained, with a yield of 73.2% based on the weight of the monomer used, a finely pulverulent polymer of vinyl chloride having an apparent density of 0.480 and the granulometry shown in the following table, which lists the percentages which pass through a series of screens having openings from 630 to 160 microns:

| Screen (microns): | Percent passed |
|---|---|
| 630 | 99 |
| 500 | 98.5 |
| 400 | 97.9 |
| 315 | 95.8 |
| 250 | 88.2 |
| 200 | 70.7 |
| 160 | 30.9 |

More than 88% of the polymer powder passed through the 250 micron screen. The percentage retained, related to the interval between any two screens, is a maximum for the dimension between 160 and 200 microns, which is 39.8% as against 30.9% for the interval between 0 and 160 microns and 17.5% for the interval between 200 and 250 microns, the percentage at other intervals being much less.

The resin had a K index of Fikentcher (connected with the degree of polymerization) equal to 63.1, a content of low polymers equal to 4.8% by weight, and 19 minutes stability to heat of 200° C. as determined by the method of French Pat. 1,104,262.

In this process the catalyst is the only ingredient added to the monomers and its quantity is only on the order of 0.03% by weight of the monomers, which does not alter the properties of the polymer even if it be included in the product. In the usual case the polymer is over 99.9% pure. The other techniques by polymerization in suspension, emulsion, atomization of latex and the like contain other ingredients such as protective colloids in suspension processes and emulsifiers in emulsion processes. Those impurities are not only capable of impairing the quality of the product but may be so toxic that they exclude the product from use as containers for food, produce bubbles, and color the product.

The polyvinyl chloride produced in mass by the present process, on the other hand, has the advantages of transparency, neutral pH, inertia to many reagents, no toxicity, and other qualities which extend its use into fields closed to the other forms. It possesses these properties just as it issues from the autoclave without other treatment. The after-treatments of polymers produced by other processes begin with separation from the medium in which they were produced.

The mass type polyvinyl chloride lacks impurities capable of affecting its thermal stability or of introducing aberrant behavior by decomposition. It gels readily and becomes very fluid when heated, facilitating its hot working and lending it superiority which is generally admitted. It can be compressed readily in a mixer to a selected and controllable degree, for instance on the roll mill. At high temperature, rare cases excepted the suspension type of polyvinyl chloride, having properties as close as possible to mass type polyvinyl chloride, undergoes greater decomposition and cannot achieve output equal to mass type polyvinyl chloride. At lower working temperatures the roll mill can work larger quantities of mass type polyvinyl chloride. It is to be understood that the mass type polyvinyl chloride under comparative discussion is that of the present invention.

Figure 4:
FIG. 4 is a section drawn from a photomicrograph of a quadrant of a grain of this new product, which is non-pellicular, spherical, and composed of particles which are of equal and micronic size.

The properties of the new product are superior in other ways, for instance in its capacity to accept modifiers in working up into shapes. Although the product is denser (apparent density) than prior types, the grains are not solid clear through. They are composed of particles (FIG. 4) self bonded to each other but with inter-particle cavities which communicate with each other and with the surface of the grain. The product being free of pellicular walls, interior or exterior, these passages readily accept modifiers such as plasticizers which penetrate throughout each grain, producing a homogeneous structure which cannot be attained by other forms.

Figure 5:
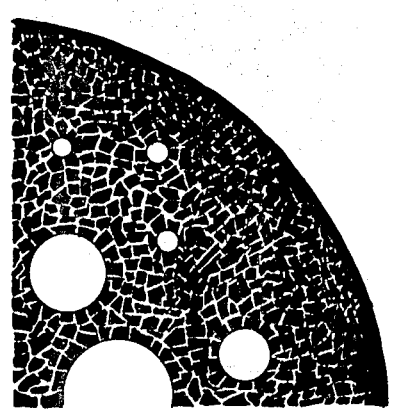
FIG. 5 is a like section through an emulsion type polymer obtained by latex atomization, showing that the particles are without cohesion, enclosed within a shell and having voids of various sizes.
Figure 6:
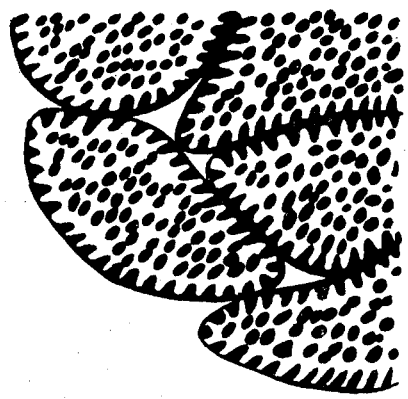
FIG. 6 is a like section through a suspension type polymer, showing the colloidal, pellicular cells which constitute the grain, lacking porosity.
Figure 7:
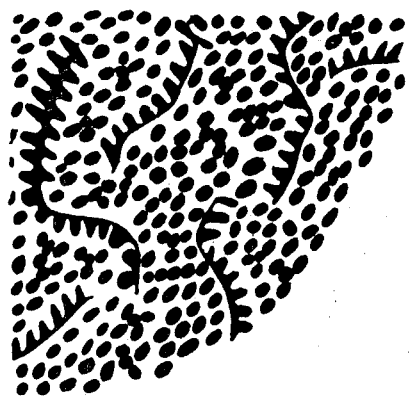
FIG. 7 is a like section of suspension type polyvinyl chloride which shows numerous interior pellicles, which would have to be destroyed to penetrate beyond them with modifiers.

In FIGS. 5, 6, and 7 are shown the structure of the other forms: FIG. 5 illustrates the microstructure of the product of atomized emulsion type polyvinyl chloride with its heavy pellicular shell and its internal, pellicular voids, some quite large; FIG. 6 illustrates the internal structure of suspension type polyvinyl chloride and the pellicular sacs which make it up; FIG. 7 illustrates suspension type polyvinyl chloride with its internal pellicles forming walls against the free flow of modifiers, and having substantial spaces between the unwelded grains. In each figure the section is a quadrant through a grain of about 100 microns.

If one compares a given quantity of polyvinyl chloride of this invention and a like quantity of polyvinyl chloride from any prior source the polyvinyl chloride of this invention will be more homogeneous in grain structure, in granulometry, and in response to working and the incorporation of modifiers incident thereto.

An imperfection of this process is the production of a substantial but not major population of grains of less than 100 microns in size, but this has been improved by later inventions assigned to this assignee. Such small particles, in a screw extrusion device have a tendency to decant in the angles of the screw and sometimes to decompose. They are removed by screening in this case and are practically nonexistent in the advanced techniques of applications Ser. Nos. 345,944 and 347,147.

Other advantages of the invention are that the objects of the invention, as stated above, have been attained. The product is more homogeneous, the particle sizes are more uniform, and the control of the process is better than was previously obtainable.

The invention includes an improvement in the polymerization in mass of ethylene derivatives, the polymers of which are insoluble in their monomers which includes polymerization in a fixed autoclave having a horizontally aligned axis, a special agitator as defined above and the apparatus of control set forth. In the preferred form, the agitator contains two spiral blades of different diameter and different band. The helices may also be of different pitch. The process provides for regulating the size and characteristics of the particles by the choice of the speeds of rotation of the agitator and/or the control of the temperature of polymerization.

As many apparently widely different embodiments of the present invention may be made without departing from the spirit and scope thereof, it is to be understood that the invention is not limited to the specific embodiments.

What is claimed is:

1. A method of producing polymers of ethylenic monomers in mass with predetermined average grain size which comprises placing a monomer, the polymer of which is insoluble in the monomer, in mass in a confined space having peripheral temperature control, establishing within the confined space conditions of temperature and pressure favorable to polymerization, moving the polymerization mass repeatedly in turbulent flow in a circuit into contact with the temperature controlled periphery, progressively therealong and in contact therewith, thence out of contact therewith and in the opposite direction, and again into contact with the said periphery until the selected polymerization end point has been attained.

2. The method of claim 1 in which the monomeric mass comprises vinyl chloride in liquid and gas phase.

3. The method of claim 2 in which the monomer is vinyl chloride, the peripheral temperature is kept at a degree which establishes a pressure circa 9.5 kg./cm.² until the pressure subsides, thereafter raising the peripheral temperature to maintain the pressure, and when the pressure falls despite an increase in the input of heat reducing the agitation, venting residual monomer, and discharging the polymer.

4. A method of making polyvinyl chloride and its ethylenic copolymers which comprises subjecting monomeric mass comprising vinyl chloride in bulk in gas and liquid condition in a space of constant volume to conditions of temperature, pressure, and catalysis favorable to polymerization, cooling the periphery of the space whereby to control the reaction, subjecting the mass to turbulent agitation and thereby turbulently intermixing its parts and moving them along and into and out of contact with the cooled periphery until the reaction mass assumes an effectively solid-gas condition, continuing the cooling and such agitation until the reaction slows, continuing such agitation while heating the periphery until a loss of pressure signals the approaching end of the polymerization, discharging residual monomer, reducing the turbulence of the agitation, and discharging the polymer.

5. Polymerization apparatus comprising a fixed cylinder having a fluid jacket and means to supply the jacket with fluid of different temperatures, an outlet in the lower part of the cylinder, and a rotary shaft extending along the axis of the cylinder having mounted thereon an agitator comprising a helical blade of diameter substantially equal to that of the cylinder and pitched on one hand, and a helical blade, of diameter less than that of the said blade and the cylinder, operating near the axis and pitched on the opposite hand, means to rotate the shaft, means to exhaust gases from the cylinder, and means to supply the cylinder with monomer.

6. Polymerization apparatus comprising a fixed cylinder with a horizontally aligned axis, a heat exchanger extend-therealong, means to admit monomer thereto, means to discharge polymer therefrom, means to discharge gas therefrom, means to move the solids in the cylinder back and forth from end to end of the cylinder, said means comprising a helical, rotary agitator having inner and outer helical blades of opposite pitch, means to drive it at different speeds, and means to maintain selected pressures within said cylinder.

7. Polymerization apparatus comprising a fixed cylinder having a horizontally aligned axis, ends comprising spherical sections, fluid jackets and means to supply the jackets with temperature control fluid of different temperature, an inlet for polymerizable fluid in the upper part of one end of the cylinder, an outlet in the lower part of the other end of the cylinder, and a rotary shaft extending along the axis of the cylinder having mounted thereon a helical scraper-agitator including an end blade conforming to the curvature of the end of the cylinder, a plurality of helical scraper blades or diameter substantially equal to that of the cylinder pitched on one hand, and at least one helical blade, of diameter less than that of the cylinder, having a greater number of turns than the said blades, pitched on the opposite hand, means to rotate the shaft, means to exhaust gases from the cylinder, and means to maintain the monomer under pressure within the cylinder.

8. The process according to claim 1 in which the monomer comprises vinyl chloride, and in which the turbulent agitation is generated by an agitator which is driven at a single speed on the order of 30 to 90 r.p.m. substantially throughout the polymerization, the speed being selected to produce an apparent density of about .430 to about .510 and particles, of sizes up to about 250 microns, in percentages from about 85.5 to about 91.5 of the product, as selected.

References Cited

UNITED STATES PATENTS

| 2,600,695 | 6/1952 | Sans. |
| 2,715,117 | 8/1955 | Baeyaert. |
| 2,981,724 | 4/1961 | Holdsworth. |
| 3,057,831 | 10/1962 | Holdsworth. |

FOREIGN PATENTS

| 1,257,780 | 2/1961 | France. |

JOSEPH L. SCHOFER, Primary Examiner

J. A. DONAHUE, JR., Assistant Examiner

U.S. Cl. X.R.

23—290; 260—85,5, 87.5, 87.7, 88.7, 91.7, 92.1